United States Patent Office

3,088,879
Patented May 7, 1963

3,088,879
RELEASE OF MICROBIAL COMPONENTS
Elmer A. Weaver, Spring Mount, Pa.
No Drawing. Filed Oct. 9, 1959, Ser. No. 845,331
13 Claims. (Cl. 195—2)

This invention relates to a procedure whereby the contents of microbial cells are easily liberated from within their cell walls.

The problem of disposing of waste microbial cells has long existed. It can be typified by considering the difficulties presently encountered in disposing of waste cells from penicillin production. These waste fungal cells can amount to a hundred thousand pounds or more daily for a single plant. Many different approaches for developing an economical or profitable disposal procedure have been tried without success. The waste cells are subject to rapid biological and chemical changes resulting in the production of contaminating growth (especially of bacteria and yeasts), strong objectionable odors, gas production, etc. Treatment with harsh chemicals such as strong acids or alkalies have presented many objectionable and unworkable features. The fungus filaments are extremely resistant to physical disintegration by any known practical piece of apparatus. Some producers have simply developed procedures for burning the waste cells as a disposal means. Whether the procedure is to burn the cells, dump them into local sewage systems, lagoon them in restricted areas, haul them away for dumping on open land areas or other disposal means, it is an expensive operation. Furthermore, it is wasteful of potentially valuable cell contents of these microbial cells. The process according to this invention provides an economical means whereby these waste cells can supply nutrients for growth of new cells, and/or, serve as a source of raw materials for proteins (or less complex proteoses, peptones, peptides, and amino acids), food, feed, vitamins, enzymes, sterols, fats, waxes and other components found in fungal cells.

Many different preparations have been tried in an effort to find a preparation which would destroy the fungal cell walls and release the cell contents. Since the fungal cell walls consist almost entirely of carbohydrate components, it was logical to assume that a carbohydrase enzyme could be effectively used. No carbohydrase enzyme tried was effective.

In accordance with this invention, the microbial cells, after harvesting, are initiated on the cell contents liberation process by contact with the active principles contained in an enzyme formulation selected from the protease group: papain with successive additions of fresh cells at intermittent times. Other conditions found suitable for the reaction to proceed are to have the pH in the general range of about pH 4.3 to pH 6.3, at a temperature of approximately 30° C. (20–40° C.), although other temperatures are operative and may be used—the reactions needed may be too slow for practical purposes in the range of 5–10° C., or, the reactions may be made to proceed very fast in the range of 75–85° C., but heat damage can result and adversely affect the self-propagating properties of the fluidized mass. A wetting agent (Tween 80 or equivalent) and mechanical agitation are advantageously used to presoak the papain powders used in order to prevent clumping. In this way an homogeneous papain solution is prepared. After liberation of the cell contents of the initial thick cell suspension, which produces a more fluid suspension, more cells are added to give a thick suspension again. This cycle of cell contents liberation and further cell addition can be repeated many times. The product of this action is termed cell components concentrate. Air is excluded as much as possible from the reaction, a reducing agent is added to prevent deterioration of formed products and to promote continued action, although these conditions are not considered essential nor restrictive over other conditions designed to accomplish a similar purpose.

It was unexpectedly discovered that papain, a well known proteolytic enzyme preparation, was capable of initiating a reaction which finally resulted in the development of the procedure in accordance with this invention for complete liberation of the contents of fungal cells. This initial reaction was not obvious because the mycelial filaments (cell walls) maintain their gross morphological features for hours or days in the presence of papain when not given the treatment according to this invention. It was not anticipated that periodic addition of fresh quantities of harvested mycelial filaments by the process of the invention would cause disappearance of the mycelial filaments and complete loss of cell structure. It was further discovered that papain enzyme formulations promoted liberation of cell contents in the presence of high solids concentrations such as is obtainable using cells comparatively free of outside amounts of fluids, such as the use of undiluted microbial cell bodies obtained by centrifugation, filtration, decantation or other means of purifying the cells from foreign substances. Another unexpected development was the ability of the liberated cell components concentrate to continue to cause liberation of cell contents from freshly added microbial cells to the extent that many times the quantities of cells normally possible in the thickest cell suspension could be repeatedly added for the production of a cell components concentrate. This continued liberation of the added microbial cells is evidently an action initiated by the presence of papain as added to the initial cell suspension preparation. The successive addition of only microbial cells at intervals throughout the liberation operation is an important and valuable facet of the invention having many advantages. Among other things, it permits the use of small amounts enzyme formulations or other catalytic agents necessary to initiate the liberation step. Another economic advantage is apparent since only small reaction containers are needed to handle harvested cells. Cells occupy a small fraction of the total volume in a ferment.

It is noteworthy that although papain has been found to be able to initiate the liberation step, bromelin, an enzyme complex in the same grouping as papain, was ineffective.

The process of this invention is illustrated by its operation using different fungal cells. Important applications of the process will be found (a) in the use of waste cells from commercial fermentations (antibiotics, enzymes, acids, etc.); (b) in the preparation of new foods such as mushroom concentrate from off-grade or surplus mushroom segments; (c) from different fungi grown on low-cost carbohydrates (surplus wheat, corn, grains, sawdust, cellulose, sugars, etc.), plant residues or wastes, plus inorganics to produce variously desired components of fungal cells; (d) in the study of cell contents liberated in their native conditions; (e) in the promotion of better microbial growth by providing a means for the cells to consume nutrients previously formed by the same cells; and (f) in the promotion of faster microbial transformation reactions by making it possible to have active fractions of the cell components present in the fermentation vessel at several times the cell solids normally capable of being present (e.g. 10 times the normal cell content).

The following detailed examples are illustrative of some of the applications of the process of the present invention.

EXAMPLE 1

*Preparation of Cell Components Concentrate From Commercially Produced Mycelium—Ball-Type*

Waste microbial cells (including a strain of *Penicillium chrysogenum*) from a penicillin producing plant were used in this example for the preparation of a cell components concentrate. The waste cells (mycelium) were obtained after going through the string filter, water washed and dewatered in a Davenport press. The mycelium was easily handled and dispersible in water. It was of the ball-type which is considered the most resistant to attack by the procedure of this invention. The balls do not present as large a surface area for attack as is obtainable with amorphous, free-floating mycelial filaments.

The filtrate from this same fermentation was used to suspend the cells. The filtrate was found to have a pH of 7.7 and a total solids content of 2.20. It was adjusted to pH 5.0 with conc. HCl. A heavy thick cell suspension was produced by adding 200 grams of the cells to 300 mls. of the filtrate. One gram of sodium bisulfite (0.2%) and 2.5 grams of papain (0.5%) was added to the cell suspension. The papain powder was wetted with a few drops of a 0.02% "Tween 80" solution before use. The mixture was contained in a quart fruit jar and mechanically agitated at 30° C. After about one hour incubation, the mixture was thin. Another 200 grams of waste cells was added. The pH was 6.2.

After two hours' incubation the mixture was noted to have a pH of 6.3 and was thinned enough to add another 200 grams of waste cells. Immediately after cell addition the mixture was very thick.

After three hours' incubation the pH was unchanged at 6.3 and the mixture was thin. Another 200 grams of waste cells was added. However, the volume had increased so that a half gallon fruit jar had to be used to hold the mixture.

After four hours' incubation the pH 6.3 was adjusted to pH 4.5 using concentrated HCl. The mixture was thin. Another 200 grams of waste cells was added.

After five and one-half hours' incubation another 300 grams of waste cells was added. This mixture was allowed to incubate overnight on the reciprocal shaker for a total incubation time of 20 hours. At this time the mixture had a pH of 5.3 and a total solids content of 17.3%. The mixture was liquefied and on high dilution with water showed a milkiness indicative of the presence of very small particles. Microscopic examination disclosed the presence of contaminating yeast growth in small numbers. There were very few mycelial fragments of any kind. The morphological features of the mycelium had disappeared. There were many free floating oil globules mostly under ten microns in size and gelatinous masses. There was also a large amount of variously shaped crystalline materials.

EXAMPLE 2

*Growth Promoting Properties of Cell Components Concentrate Prepared in Example 1*

The nutritive value of the cell components concentrate of Example 1 was demonstrated by using it as a nutrient source for *Aspergillus ochraceus* in the following media:

| Sample | Identification |
|---|---|
| 1 | Filtrate (F) from penicillin fermentation of Example 1. |
| 2 | Cell components concentrate prepared in Example 1 diluted with F to give 1.7% cell solids. |
| 3 | F plus 1.7% cell components concentrate plus 5% sucrose. |
| 4 | F plus 1.7% cell components concentrate plus 5% sucrose plus 1% corn steep liquor. |
| 5 | F plus 8.5% cell components concentrate. |
| 6 | Water plus 8.5% cell components concentrate. |

Test results were as follows:

18 HOURS' INCUBATION

| Sample | Growth | | Dry cell weight per 100 mls., grams |
|---|---|---|---|
| | Amount | Type | |
| 1 | (1) | B | 0.292 |
| 2 | (2) | A | 1.140 |
| 3 | (2) | A | 1.366 |
| 4 | (2) | A | 1.672 |

40 HOURS' INCUBATION

| 5 | (2) | A | 3.462 |
| 6 | (2) | A | 3.684 |

[1] Poor growth.  [2] Excellent growth.
NOTE.—A equals amorphous, B equals ball-type.

The cell components concentrate either alone or with fermentation filtrate can support microbial growth. The cell components concentrate in this example was obtained from a commercial source such as would be the case in actual practice.

The filtrate alone gave poor microbial growth. The filtrate plus 1.7% cell solids showed excellent visual growth and the mycelium was found microscopically to be in an active state of branching indicating healthy cells. Added sucrose or sucrose plus corn steep liquor to the filtrate plus cell components concentrate medium gave increased dry cell weights but this could be merely associated with the higher osmotic pressure occasioned by the higher solids concentration with these additives.

Higher osmotic concentrations obtained with the use of increased amounts of cell components concentrate (5×) also showed dry cell weights greater than with filtrate plus cell components concentrate at the lower level. The important development here is the comparison of growth and dry cell production between the filtrate and plain water. Plain water can be used as a substitute for the fermentation filtrate.

The results of this example show that the filtrate and the residue of microbial cells on the filter can be recombined to support microbial growth again, if the microbial cells are treated according to the inventive process. Microbial cells prepared by the process according to this invention make it possible for a growing organism to be "cannibalistic" on cell solids formed by previously grown cells.

EXAMPLE 3

The fruiting bodies of the fungus *Agaricus campestris*, commonly referred to as mushrooms, were reduced to pieces about 1/16" in diameter in a meat grinder. These pieces were then treated by the procedure given in Example 1. A cell components concentrate five times the normal cell amount was prepared. A rich aroma characteristic of fresh mushrooms was evident in the cell components concentrate.

EXAMPLE 4

*Preparation of Cell Components Concentrate From Commercially Produced Mycelium—Amorphous Type*

These waste microbial cells were processed as in Example 1 except that in this case the growth was amorphous with mostly free-floating mycelial filaments.

200 grams of this Davenport pressed mycelium was suspended in 300 mls. of distilled water. After thoroughly mixing it was found to have a pH of 7.7. 3.5 mls. of concentrated hydrochloric acid brought the suspension to pH 5.0 One gram of sodium bisulfite (0.2%) and 2.5 grams papain (0.5%) were added to the cell suspension. The papain powder was wetted with a few drops of "Tween 80" solution before use. Two quart fruit jars each with 500 grams of the very thick cell suspension was used. One jar was untreated; the other jar received 0.3% potassium sorbate, in order to show the effect of a microbial inhibitor on the end result. Both jars were mechanically agitated at about 28° C.

The following table shows the schedule of Davenport pressed mycelium additions with observations.

| Hours Elapsed Time | Thickness | Grams Davenport pressed mycelium added | pH | Misc. |
|---|---|---|---|---|
| 0 | ++++ |  | 5.0 | Start of test. |
| ½ | + | 200 |  |  |
| 1¼ | ++ | 200 | 6.2 | Added 1.5 mls. concentrated HCl. |
| 1¾ | ++++ |  | 5.4 |  |
| 3½ | + | 300 |  |  |
| 5¾ | + | 300 |  |  |
| 7 | + | 500 |  |  |
| 17 | + |  | 6.1 | Stopped incubation. Final volume, 1,980 mls. |

The incubation was extended to 17 hours as a matter of convenience in letting the test run overnight. Indications are that the cells were disintegrated in a much shorter period of time.

The untreated container was found to be heavily contaminated with bacilli. The fungus mycelium was disintegrated. The morphological features of the mycelium had disappeared. There were large gelatinous masses present. Some yellow oily to wax-like materials floated on the surface. There was a slight sulfide odor. The liquefied cell components concentrate had the color of the Davenport pressed mycelium. It was heated to 120° F. and divided into two lots. One lot was bottled, cooled and stored at 75° F.—coded sample 16-0. One tenth of 1% potassium sorbate was added to another lot, cooled, and the sample for storage at 40° F. was coded sample 16-0-40 while the sample for storage at 75° F. was coded sample 16-0-75.

The container treated with an initial concentration of 0.3% potassium sorbate (final concentration 0.075%) showed no contamination. The fungus mycelium was disintegrated. The morphological features of the mycelium had disappeared. There was a large amount of oily to wax-like materials floating on the surface. The cell components concentrate had no odor and was the color of the Davenport pressed mycelium. The cell components concentrate was heated to 120° F. and samples taken for storage after zero, 15, 30 and 60 minutes, and stored at 40° F. The samples were coded as follows.

Code:                              Time held at 120° F. in minutes
16-KS-0 _____ 0
16-KS-15 _____ 15
16-KS-30 _____ 30
16-KS-60 _____ 60

Sample 16-KS-0-75 was heated to 120° F., cooled and stored at 75° F.

The untreated material and the sample treated with potassium sorbate behaved similarly throughout the first 7 hours of the test, i.e. no contamination was evident. At the end of the test, it was found that the untreated sample was contaminated and the potassium sorbate-treated sample was free of contamination. Thus it is seen that the addition of potassium sorbate provides a way to produce cell components concentrate free of contaminating organisms.

The nutritive value of the prepared cell components concentrate was evaluated using *Aspergillus ochraceus* as the test organism in the following media:

| Sample | Identification |
|---|---|
| "SEC" | 5% sucrose, 2% Edamin, 0.5% corn steep liquor. |
| 16-0-40 | Cell components concentrate of this sample diluted with distilled water to give 1.7% solids. |
| 16-KS-0 | Do. |
| 16-KS-60 | Do. |

After 24 hours' incubation the cells were harvested, water washed and dried. All samples showed very good growth. Results of cell yield were as follows.

Sample:                         Grams dry cells per 100 mls.
"SEC" _____ 1.556
16-0-40 _____ 1.064
16-KS-0 _____ 1.214
16-KS-60 _____ 1.082

From these results it is evident that the cell components concentrate solids can support microbial growth. It is to be noted that "SEC" (5% sucrose, 2% Edamin, 0.5% corn steep liquor) medium had a solids content of 7.5% while the test media had only 1.7% solids. The higher amount of solids in the medium can appear to support more growth than lower solids when short incubation periods are compared because the mycelium is exposed to a higher osmotic pressure to absorb solubles.

These results also indicate that the presence of contamination in the cell components concentrate and further digestion of the cell components concentrate by exposure to 120° F. for one hour is not conducive to best cell growth. The viscosity of samples 16-0-40 and 16-KS-0 was about the same. Both of these samples became quite viscous when exposed to the 40° F. storage temperature. Sample 16-KS-60 was considerably thinned by the higher temperature exposure, and thus did not show a great increase in viscosity when exposed to the storage temperature of 40° F. Exposure to the 120° F. temperature evidently caused breakdown of complex components to simpler materials having decreased sensitivities to low temperature exposure. These materials formed by exposure to the higher temperature of 120° F. for 60 minutes are not as conducive to rapid cell growth as the materials present in the cell components concentrate merely brought to 120° F. and then cooled to 40° F.

Centrifugation of these samples showed them all to have about three percent white solids. These white solids were found to be crystalline and chemical tests indicate these solids are calcium carbonate, a normal additive in penicillin fermentations. Above the white solids there was a gelatinous highly viscous layer accounting for about forty-one percent of the total. Slightly cloudy supernatant fluid accounted for about fifty-six percent of the total volume. This supernatant fluid was examined for total solids content with the following results.

Sample:                                      Percent solids
16-0-40 _____ 10.8
16-KS-0 _____ 11.2
16-KS-30 _____ 11.3
16-KS-60 _____ 11.7

These results indicate that exposure of the cell components concentrate for 60 minutes to a higher temperature causes an increase in soluble solids.

The nutrient properties of samples 16-0-40 were further tested in surface culture of *Aspergillus ochraceus*. Excellent vegetative growth was produced at total solids concentrations tested of 1.7 and 5.0%. Sporulation was poor or absent. Sporulation could be made to occur by the addition of small quantities of dibasic potassium phosphate, malt or whole potato solids.

EXAMPLE 5

*Preparation of Cell Components Concentrate Free From All Foreign Substances*

In many cases it is desirable to obtain cell contents without the presence of any outside substances. In this way the characteristics of the cell contents can be studied in essentially their native condition. This example describes a procedure which yields cell contents without the use of extreme treatment conditions (high pressure, freezing, grinding, or harsh chemical and physical agents) and the absence of enzyme formulations used to initiate the reaction.

A suspension of waste microbial cells was prepared as given in Example 4 using 0.2% sodium bisulfite and 0.5% papain at pH 5.0. The suspension was tested for its resistance to disintegration by passage through a modified Logeman-type hand homogenizer. This homogenizer consisted essentially of two flat plates held together under spring tension with a piston to force the suspension between the plates. The end of the cylinder served as the stationary plate while the other plate was movable under the spring tension. Untreated mycelial filaments could not be forced, by hand operation of the handle, between the pressure plates.

The mycelial filaments exposed to the action of the inventive process were filtered, water washed and re-suspended in an equal volume of water before testing in the hand homogenizers. This procedure was designed to remove and wash away all materials outside the cell walls. The following results were obtained:

| Reaction time, minutes | Homogenizer pressure | |
|---|---|---|
| | Low | High |
| 0 | 0 | 0 |
| 10 | XX | 0 |
| 20 | XXX | X |
| 40 | XXXX | XX |

NOTE.—0—Does not pass between the plates. XXXX—Passes between the plates easily.

The mycelial filaments passed through the high pressure plates of the homogenizer were found on microscopical examination to be disintegrated. Thus, the cell contents were liberated. There were free floating masses of gelatinous material, oil globules and cell wall remnants.

EXAMPLE 6

*Stabilization of Cell Components Concentrate*

Destruction of the cell components concentrate occurs through microbial contaminations without treatment. Storage stability of the cell components concentrate is desirable in order to permit truck transportation to distant processing plants or for in-plant storage in tanks before processing. This example will illustrate the stability of the cell components concentrate under various conditions.

STORAGE CONDITIONS

| Sample | Identification |
|---|---|
| 16-0 | Re Example 4, cell components concentrate prepared in the absence of potassium sorbate, heated to 120° F., cooled, stored at 75° F. |
| 16-0-40 | Same as sample 16-0 except 0.1% potassium sorbate added and stored at 40° F. |
| 16-0-75 | As in sample 16-0-40 except stored at 75° F. |
| 16-0-75-NH | As in sample 16-0-75 except no heat treatment. |
| 16-KS-0 | Re Example 4, cell components concentrate prepared in the presence of potassium sorbate, heated to 120° F. cooled, stored at 40° F. |
| 16-KS-0-75 | As in sample 16-KS-0 except stored at 75° F. |

Sample 16-0, heated to 120° F. only, was found to be spoiled in 24 hours due to an abundant growth of bacilli. The bacterial growth also produced copious quantities of gas and foul odors. Sample 16-0-75-NH, with potassium sorbate only and no heat, became spoiled, ditto to sample 16-0 after three days storage.

All other samples were free of microbial growths or other signs of biological deterioration after three months storage.

Cell components concentrate can be stabilized for long term storage by a procedure of adding potassium sorbate either before or after completion of liquefaction plus mild heating to a temperature of about 120° F.

Although storage at temperatures above 40° F. is possible as indicated by the results, storage at 40° F. or lower may be preferred if further enzymatic changes are to be minimized.

Variations in the use of the inventive process to meet the convenience of any particular operation will become apparent to those skilled in the art. Some of these may be listed as:

(1) About 30 minutes after the addition of fresh microbial cells to the liberated cell contents, the material may be processed through a high pressure homogenizer. This serves to burst open any intact cells and reduces particle size for greater surface exposure to the liberating action. This procedure reduces overall operating time significantly. The exact time of homogenization, whether immediately, or at some interval later will be determined by the speed of the liberation and the nature of the end result desired.

(2) It may sometimes be convenient to spray or dip the fresh microbial cells with the liberated cell components concentrate. The treated microbial cells are then conveyed to storage tanks for completion of the operation.

(3) Adjustment of the liberation conditions may sometimes be desirable, such as changes in temperature, pressure, degree of agitation, additives either initially or at later intervals for control of the course of liberation, heat shock (mild heating) of the microbial cells before the liberation step, pasteurization of the microbial cells before the liberation step or after the liberation step, the use of microbial growth inhibitors (other than the potassium sorbate mentioned in the examples) and at different concentrations, the use of emulsifiers to disperse the gelatinous masses and large oil globules sometimes produced, etc. in order to influence the end product desired. For example, if native proteins or enzymes are desired the liberating conditions should be kept as mild as possible. If in the case of protein liquefaction it is desired to have a high proportion of proteoses, peptones, peptides or simple amino acids, then the liquefying conditions can be intensified.

Suitable optional additives, grouped in accordance with their functions, are listed below:

Activating:
  Glutathione, sodium bisulfite, ascorbic acid, chloride ions, etc.
Inactivating:
  Hydrogen peroxide, iodoacetic acid, sodium azide, etc.
Chelating:
  Such as the "Versenes"
Metal ions:
  Iron, copper, cobalt, zinc, etc.

The cell components concentrate can be used to grow cells either by using the original filtrate from the fermenter as the diluent or by simply using water as a diluent. This makes it possible for a fermentation to be self-contained in that the waste products are in a condition to serve as nutrients for fresh cell production. Only small amounts of selected additives may be needed to keep the fermentation self-perpetuating and held at a performance level needed to carry out the required transformation reaction efficiently. Energy sources such as carbohydrates or inorganics such as nitrogen, potassium and phosphorus and trace elements may most frequently be needed as supplements in the growth medium.

The process of this invention makes it possible to obtain additional sources of protein by conversion to fungal cells of low-cost carbohydrates such as cellulose, grains, vegetable and fruit wastes, surpluses and wastes from other sources (including industrial and human sewage) with or without appropriate supplements. For high protein production the fungi especially need nitrogen but they are capable of utilizing cheap inorganic nitrogen (also potassium and phosphorus) for this purpose. Various fungi are capable of growing on these materials with the production of fungal mycelium high in protein. Fungi are natural scavengers and are able to flourish on complex food sources (lignins, resins, cellulose, starch, fish scraps, slaughter house wastes, cottonseed meal, etc.), and live on food sources under environmental conditions inhibitory to most other forms of micro-organisms (high osmotic pressure, low pH, toxic materials, cheap inorganic elements (nitrogen, phosphorus, potassium, etc.)) plus carbohydrates, etc. After production of an abundance of microbial cells, the fungal mycelium can then be given the treatment in accordance with this invention for release and biological availability of the proteins. The same procedure can be used for the production of other food constituents, enzymes, vitamins, oils, fats, waxes and other cellular components found in many species of fungal mycelium.

Having thus described my invention, I claim:

1. In a method of liberating the contents of microbial cells by mycelial disintegration, the step which comprises contacting said cells with the enzyme papain in a solution maintained at a pH in the range of about 4.3 to 6.3 at an ambient temperature in the range of from about 5° C. to about 85° C.

2. In a method of liberating the contents of microbial cells by mycelial disintegration, the steps which comprise contacting said cells with the enzyme papain in a solution maintained at a pH in the range of about 4.3 to 6.3 at an ambient temperature in the range of from about 5° C. to about 85° C., and agitating the resulting mixture mechanically.

3. In a method of liberating the contents of microbial cells by mycelial disintegration, the steps which comprise contacting said cells with the enzyme papain, in a solution maintained at a pH in the range of about 4.3 to 6.3 and at a temperature in the range of about 20–40° C., and agitating the resulting mixture.

4. In a method of liberating the contents of microbial cells by mycelial disintergation, the steps which comprise preparing an homogeneous solution of the enzyme papain, contacting said cells with said solution while said solution is maintained at a pH in the range of about 4.3 to 6.3 and at a temperature in the range of about 20–40° C. and agitating the resulting mixture.

5. In a method of liberating the contents of microbial cells by mycelial disintegration, the steps which comprise attacking the cell walls by contacting them with the enzyme papain in a solution maintained at a pH in the range of about 4.3 to 6.3 at an ambient temperature in the range of from about 5° C. to about 85° C., and adding fresh cells to the cell components concentrate thus produced, whereby said cells are attacked by said cell components concentrate.

6. In a method of liberating the contents of microbial cells selected from the group consisting of *Penicillium chrysogenum* and *Agaricus campestris* by mycelial disintegration, the steps which comprise contacting said cells with papain in a solution maintained at a pH in the range of about 4.3 to 6.3 and at a temperature of about 20–40° C. and agitating the resulting mixture.

7. In a method of liberating the contents of microbial cells by mycelial disintegration, the steps which comprise contacting said cells with the enzyme papain in a solution maintained at a pH in the range of about 4.3 to 6.3 at an ambient temperature in the range of from about 5° C. to about 85° C., while substantially excluding air.

8. In a method of liberating the contents of microbial cells by mycelial disintegration, the steps which comprise contacting said cells with the enzyme papain, in a solution maintained at a pH in the range of about 4.3 to 6.3 and at a temperature in the range of about 20–40 C., said solution containing a compatible and effective reducing agent, and agitating the resulting mixture while substantially excluding air.

9. In a method of liberating the contents of microbial cells by mycelial disintegration, the steps which comprise preparing an homogeneous solution of the enzyme papain, contacting said cells with said solution while said solution is maintained at a pH in the range of about 4.3 to 6.3 and at a temperature in the range of about 20–40° C., agitating the resulting mixture until it contains gelatinous and liquid fractions, and then physically separating said gelatinous and liquid fractions.

10. In a method of liberating the contents of microbial cells by mycelial disintegration, the steps which comprise preparing an homogeneous solution of the enzyme papain, contacting said cells with said solution while said solution is maintained at a pH in the range of about 4.3 to 6.3 and at a temperature in the range of about 30° C., thereby producing from said microbial cells, materials that float and materials that do not.

11. The process according to claim 1, further including the step of homogenizing the resulting mixture.

12. In a method of fluidizing microbial cells which are mixed with a liquid culture medium in order to provide such cell contents in a biologically available form, the steps which comprise removing at least a major portion of said liquid culture medium, thereby harvesting said cells, then contacting the harvesting cells with the enzyme papain in a solution maintained at a pH in the range of about 4.3 to 6.3 at an ambient temperature in the range of from about 5° C. to about 85° C., and continuing such contact until the solid cells are fluidized by mycelial disintegration.

13. The method defined in claim 12 further characterized by the continuous addition of freshly harvested cells into the fluidized product, thereby fluidizing said freshly harvested cells by mycelial disintegration.

References Cited in the file of this patent

UNITED STATES PATENTS

| | | |
|---|---|---|
| 2,158,499 | Grassmann et al. | May 16, 1939 |
| 2,809,113 | Stimpson et al. | Oct. 8, 1957 |
| 2,890,988 | Burger et al. | June 16, 1959 |

OTHER REFERENCES

Myrback et al.: Arkiv Kemi, vol. 8, pages 367–74, abstracted in Biological Abstracts 1956, 11483.